United States Patent [19]

Mohri et al.

[11] Patent Number: 5,061,575

[45] Date of Patent: Oct. 29, 1991

[54] LUBRICATING RESIN COATED STEEL STRIPS HAVING IMPROVED FORMABILITY AND CORROSION RESISTANCE

[75] Inventors: Taizo Mohri; Nobuo Totsuka; Shunichi Tsugawa; Takao Kurisu, all of Chiba; Hideaki Sawatari, Kobe; Tanehiro Inoue, Kurashiki, all of Japan

[73] Assignee: Kawasaki Steel Corporation, Hyogo, Japan

[21] Appl. No.: 359,221

[22] Filed: May 31, 1989

[30] Foreign Application Priority Data

May 31, 1988 [JP] Japan .............................. 63-133515
May 31, 1988 [JP] Japan .............................. 63-133516
May 31, 1988 [JP] Japan .............................. 63-133517

[51] Int. Cl.[5] .............................................. B32B 15/04
[52] U.S. Cl. ...................................... 428/623; 428/626
[58] Field of Search ................................ 428/623, 626

[56] References Cited

U.S. PATENT DOCUMENTS 4,804,587 2/1989 Takeuchi ............................ 428/623
4,889,775 12/1989 Adaniya ............................ 428/623
4,891,273 1/1990 Odashima ............................ 428/623
4,970,126 11/1990 Adaniya ............................ 428/623

FOREIGN PATENT DOCUMENTS 54-37005 11/1979 Japan .
61-60886 3/1986 Japan .
62-73938 4/1987 Japan .
62-24505 5/1987 Japan .
63-2310 1/1988 Japan .
63-35798 2/1988 Japan .
63-83172 4/1988 Japan .

*Primary Examiner*—Peter D. Rosenberg
*Attorney, Agent, or Firm*—Bierman and Muserlian

[57] ABSTRACT

A zinc, zinc alloy or aluminum alloy plated steel strip having chromate coatings on both surfaces is coated with a lubricating resin composition for improving formability and corrosion resistance. In one form, a resin composition including a base resin, silica, a high-melting polyolefin wax and optionally, a low-melting polyolefin wax is applied on both surfaces for improving formability. In a second form, a resin composition including a base resin, silica, and a powder fluoro resin is applied on both surfaces for improving corrosion resistance. In a third form, the chromated steel is coated with a resin composition including a base resin, silica and a solid lubricant on one side and with a resin composition including a base resin and silica on the other side for improving both formability and corrosion resistance.

10 Claims, No Drawings

LUBRICATING RESIN COATED STEEL STRIPS HAVING IMPROVED FORMABILITY AND CORROSION RESISTANCE

This invention relates to lubricating resin coated steel strips having improved formability and corrosion resistance and thus suitable for use in automobiles, electric appliances, and buildings.

BACKGROUND OF THE INVENTION

Steel strips or sheets, more particularly plated steel strips such as zinc or zinc base alloy plated steel strips are often used in automobiles, electric appliances, buildings and the like with or without coating. Before coating, they must have passed a number of steps and are kept uncoated for a sustained length of time. During the process, often rust will occur and various deposits and debris will deposit and adhere to the surface of plated steel strips, both adversely affecting the adherence of a subsequently applied paint.

Thus the plated steel strips are chromate treated as a primary measure for protecting rust formation until they are used by the users. Ordinary chromate treatment can provide a limited degree of corrosion resistance which is as low as 24 to 48 hours as examined by a salt spray test. A special chromate treatment, which is a coating chromate treatment using a chromate solution having silica sol added, can achieve an increased degree of corrosion resistance which is just 100 to 200 hours as examined by a salt spray test. This order of corrosion resistance, however, is insufficient for steel strips destined for long term service under a severe corrosive environment.

For service under a severe corrosive environment, another known approach for preventing corrosion is by subjecting the plated steel strips to phosphate treatment instead of chromate treatment and applying a paint coating of about 20 μm thick. Such relatively thick coatings tend to crack or peel off during pressing or mechanical forming of the associated steel strips, resulting in a local loss of corrosion resistance. In addition, since coated strips are difficult or almost impossible to weld as by spot welding, the paint coating must be removed from welding sites. Thicker coatings, of course, consume larger amounts of paint, increasing the cost.

There is a need for surface-treated steel strips which have high corrosion resistance by themselves without paint.

In general, lubricant oil is applied to steel strips before they are press formed. Thus the process must be followed by degreasing. Therefore, there is a need for surface-treated steel strips which can be press formed without applying lubricant oil.

Conventional surface-treated steel strips are processed into commercial articles through a series of steps on the user side. During handling by the operator, the strip surface is prone to be stained as by finger prints, which will contribute to a marked drop of the commercial value. Therefore, there is a need for surface-treated steel strips which are resistant to stains as by finger prints during handling.

Several prior art approaches are known to meet these demands.

Japanese Patent Publication No. 24505/1987 discloses a dual coated chromate steel strip having improved corrosion resistance and lubricity comprising a chromate coating on a zinc-base alloy plated steel substrate and a layer thereon of a urethane-modified epoxy resin containing composite aluminum phosphate, a chromium base anti-rust pigment, and a lubricant selected from polyolefin wax, molybdenum disulfide, and silicone. The coating weight of the resin layer is from 1 to 10 g/m$^2$.

Japanese Patent Application Kokai No. 35798/1988 discloses an organic coated steel strip having improved cationic electro-deposition capability comprising a chromate coating on a zinc-base alloy plated steel substrate and a layer thereon of a urethane-modified epoxy ester resin containing silica powder, a hydrophilic polyamide resin, and a polyethylene wax lubricant. The resin layer has a thickness of 0.3 to 5 μm.

Japanese Patent Application Kokai No. 73938/1987 discloses a corrosion resistant coated laminate comprising a steel substrate having a gamma-phase monolayer of nickel-containing zinc plated thereon, a chromate coating thereon, and a coating thereon containing a base resin, iron phosphide conductive pigment, and a lubricant selected from polyolefins, carboxylate esters, and polyalkylene glycols. The resin coating has a thickness of 1 to 20 μm.

These three types of surface-treated steel strip are dual coated steel strips having improved corrosion resistance and lubricity characterized by having a lubricating resinous coating containing a polyolefin lubricant on the chromate coating.

The dual coated steel strips of the above-cited patent publications were successful in press forming at low speeds of about 5 mm/sec. However, they were found to give rise to several problems in actual pressing as typified by press forming at high speeds of about 250 mm/sec. Under such severe working conditions, frictional contact of the strips with the die or punch causes the strip surface to raise its temperature to 70° C. or higher, at which temperature the resinous coatings become brittle and prone to separate. Powdered resin will deposit on the die and the blank being formed, adversely affecting continuity of press working and the appearance of formed articles. These strips were also found to be unsatisfactory in deep drawability.

SUMMARY OF THE INVENTION

A primary object of the present invention is to provide a novel and improved surface-treated steel strip which can be continuously press formed at high speeds.

Another object of the present invention is to provide such a surface-treated steel strip which can be press formed without application of lubricant.

A further object of the present invention is to provide such a surface-treated steel strip which is resistant to stains as by fingerprints during handling.

Still another object of the present invention is to provide such a surface-treated steel strip having improved continuous deep drawability.

Yet another object of the present invention is to provide such a surface-treated steel strip having improved corrosion resistance.

According to a first aspect of the present invention, there is provided a lubricating resin coated steel strip having improved formability, comprising a steel substrate having zinc, a zinc base alloy or an aluminum base alloy plated on each surface thereof, a chromate coating on each surface of the substrate, the chromate coatings each having a coating weight of up to 200 mg/m$^2$ of metallic chromium, and a resin coating on each of the chromate coatings, the resin coatings being formed from a resin composition comprising (a) 100 parts by weight of a resin having a hydroxyl and/or carboxyl group, (b) 10 to 80 parts by weight of silica, and (c) up to 20 parts by weight of a polyolefin wax having a melting point of at least 70° C., the resin composition having a glass transition temperature Tg of at least 70° C., the resin coatings each having a dry coating weight of 0.3 to 3 gram/$m^2$.

Preferably, the resin composition contains as component (c) a mixture of a polyolefin wax having a melting point of lower than 70° C. and a polyolefin wax having a melting point of at least 70° C. The former wax is up to 70% by weight of the mixture.

According to a second aspect of the present invention, there is provided a lubricating resin coated steel strip having improved corrosion resistance, comprising a steel substrate having zinc, a zinc base alloy or an aluminum base alloy plated on each surface thereof, a chromate coating on each surface of the substrate, the chromate coatings each having a coating weight of 10 to 200 mg/$m^2$ as Cr and a resin coating on each of the chromate coatings, the resin coatings being formed from a resin composition comprising (a) 100 parts by weight of a resin having a hydroxyl and/or carboxyl group, (b) 10 to 80 parts by weight of silica, and (c) 1.0 to 20 parts by weight of a powder fluoro resin, the resin composition having a glass transition temperature Tg of at least 70° C., the resin coatings each having a dry coating weight of 0.3 to 3 gram/$m^2$.

Preferably, the resin composition further comprises (d) a polyolefin wax having a melting point of at least 70° C., the weight ratio of polyolefin wax to fluoro resin being up to 1.0. Also preferably, the powder fluoro resin has a particle size of 1 to 7 μm. More preferably, the resin composition further comprises (e) a silane coupling agent.

According to a third aspect of the present invention, there is provided a lubricating resin coated steel strip having improved formability and corrosion resistance, comprising a steel substrate having zinc, a zinc base alloy or an aluminum base alloy plated on each surface thereof, and chromate coatings on both surfaces of the substrate. A resin coating is formed on one of the chromate coatings from a resin composition comprising (a) a resin having a hydroxyl and/or carboxyl group, (b) silica, and (c) a solid lubricant and having a glass transition temperature Tg of at least 70° C. Another resin coating is formed on the other chromate coating from a resin composition comprising (a) a resin having a hydroxyl and/or carboxyl group and (b) silica. Each of the resin coatings having a dry coating weight of 0.3 to 3 gram/$m^2$.

Preferably, the solid lubricant comprises a fluoro resin or a polyolefin compound having a melting point of at least 70° C. More preferably, the solid lubricant comprises a mixture of a fluoro resin and a polyolefin compound.

DETAILED DESCRIPTION OF THE INVENTION

All the lubricating resin coated steel strips according to the present invention are based on the same types of steel stock including steel strips or sheets having zinc, a zinc base alloy or an aluminum base alloy plated on both surfaces thereof. Examples of the starting steel include zinc electroplated steel, zinc-nickel electroplated steel, zinc hot dipped steel, and 5% aluminum-zinc hot dipped steel. A typical example of aluminum base alloy for plating is an aluminum-zinc alloy containing more than 50% by weight of aluminum. The starting steel stock is sometimes referred to as zinc plated steel since all these platings contain zinc.

The chromate coatings on both surfaces of the zinc plated steel substrate are also common to all the lubricating resin coated steel strips according to the present invention in any aspects. The chromate coatings may be conventional well-known ones. For example, zinc plated steel on both surfaces may be treated with a chromate treating solution, for example, an aqueous solution containing chromic anhydride, a chromate salt, dichromic acid or the like as an active ingredient or a solution containing colloidal silica in such an aqueous solution by conventional well-known procedures. There results a chromate coating predominantly comprising hydrated chromium oxides.

First Embodiment

The lubricating resin coated steel strip having improved press formability according to the first embodiment of the present invention is described. The steel strip in the first form has an organic resin coating of the following composition and coating weight on each of the chromate coatings as described above. The organic resin coatings on opposite sides are generally the same.

The resin coatings are formed from a resin composition comprising (a) 100 parts by weight of a resin having a hydroxyl and/or carboxyl group, (b) 10 to 80 parts by weight of silica, and (c) up to 20 parts by weight of a solid lubricant in the form of a polyolefin wax having a melting point of at least 70° C. or a mixture of a polyolefin wax having a melting point of lower than 70° C. and a polyolefin wax having a melting point of at least 70° C.

The resin composition has a glass transition temperature Tg of at least 70° C. Each of the resin coatings has a coating weight of 0.3 to 3.0 gram/$m^2$ on a dry basis.

The base resin used in the lubricating resin composition is a resin having a hydroxyl group or a carboxyl group or both hydroxyl and carboxyl groups. Examples of the base resin include epoxy resins, alkyd resins, acrylic resins, urethane resins, phenolic resins, melamine resins, and polyvinyl butyral resins.

The resins having a hydroxyl group and/or a carboxyl group are effective for the following reason. As described above, the lubricating resin coated steel strip in the first form is provided with an inorganic-organic composite coating of silica and resin for the purpose of improving corrosion resistance. Hydroxyl and carboxyl groups are desirable as the active group capable of reacting with hydroxyl groups on the silica surface to form a highly corrosion resistant film.

Silica is blended for the purpose of improving the corrosion resistance of the lubricating resin coated steel strip. A choice may be made of colloidal silicas such as Snowtex-O and Snowtex-N (both manufactured by Nissan Chemical K.K.), organosilica sols such as ethyl cellosolve silica sol available from Nissan Chemical K.K., silica powder such as gas phase silica powder available from Aerogel K.K., and organic silicates such as ethyl silicate. The powder silica preferably has a particle size of 5 to 70 nm for uniform dispersion.

A silane coupling agent may be included as a promoter for enhancing reaction between the base resin and silica. Examples of the silane coupling agent include γ-(2-aminoethyl)aminopropyltrimethoxysilane and γ-glycidoxypropyltrimethoxy-silane.

Any commonly used additives including reaction promoters, stabilizers and dispersants may be blended with the base resin without detracting from the effectiveness of the present invention. Blending of such additives is often desirable.

The lubricity imparting agent is now described.

In general, various dry lubricants are known including wax, molybdenum disulfide, organic molybdenum compounds, graphite, carbon fluorides, metal soap, boron nitride and fluoro resins. These materials are used as lubricants for bearings or added to plastics, oil, grease or the like for improving lubricity. Using these dry lubricants, we attempted to produce resin coated steel strips having good lubricity.

As described above, high speed press working imposes working conditions under which an amount of heat generates due to frictional slide motion. In order that resin coated steel strips have sufficient lubricity to allow for continuous press forming at high speeds without incurring coating separation under such severe press working conditions, a resin coating is necessary in which a lubricant having a low coefficient of friction and a high melting point is uniformly distributed on the surface. When steel strips are coated with such resin coatings, the lubricant uniformly distributed on the coating surface will reduce friction with the die or punch, thus preventing damage to the resin coating and improving continuous press formability.

We have found that organic lubricants having a relatively high melting point and a relatively low specific gravity can meet the above-mentioned requirements and inter alia, a polyolefin wax having a melting point of at least 70° C. (to be referred to as high-melting, hereinafter) is a useful lubricant.

During the high-speed press forming process, strips are heated to high temperatures on their surface in frictional contact with the die or punch. At this point, the high-melting polyolefin wax performs well as the lubricant.

It has been found that addition of a polyolefin wax having a melting point of lower than 70° C. (to be referred to as low-melting, hereinafter) to the high-melting polyolefin wax can further improve lubricity. Lubricity is enhanced for the following reason.

Strips become hot on their surface in frictional contact with the die or punch during the high-speed press forming process as described above. The use of the high-melting polyolefin wax which exerts good lubricity at high temperatures is, of course, effective in improving lubricity. However, since the strip is at room temperature at the initial stage of press forming, the addition of low-melting polyolefin wax which is a good lubricant at room temperature assists in improving lubricity even at the initial.

When a mixture of two types of polyolefin wax, that is, high- and low-melting polyolefin waxes is used, the low-melting polyolefin wax serves at the initial stage and the high-melting polyolefin wax serves at intermediate to final stages. Lubricity is thus improved throughout the press forming process. However, since the strip temperature quickly increases at the very initial stage of forming and since there is little possibility that the strip be broken within a very short time when the strip remains at room temperature, addition of only the high-melting polyolefin wax can provide sufficient lubricity.

It is to be noted that addition of the low-melting polyolefin wax has another advantage of improving the dispersion of the wax in the base resin.

The polyolefin wax may be selected from polymers of olefinic hydrocarbons, for example, polyethylene, polypropylene, and polybutene.

The numerical limits on the coating weight of the coatings and the proportion of components blended will be described.

In the first embodiment, the chromate coating on each surface may have a coating weight of up to 200 $mg/m^2$ as Cr. Coating weights of more than 200 $mg/m^2$ are no longer advantageous for various reasons. Further improvement in corrosion resistance is less expectable for increments of coating weight. The chromate treating solution is drastically exhausted to render the surface appearance poor. In addition, thicker chromate coatings will adversely affect press formability.

The resin composition in the form of a resin mixture or resin composite contains specific proportions of the essential components, base resin, silica, and polyolefin wax.

The silica which is used for the purpose of improving corrosion resistance is added in an amount of 10 to 80 parts by weight per 100 parts by weight of the resin having a hydroxyl and/or carboxyl group. Less than 10 parts by weight of silica is less effective for corrosion resistance improvement. More than 80 parts by weight of silica forms a hard film which is prone to galling, lowering press formability.

The polyolefin wax or lubricity imparting agent is added in an amount of up to 20 parts by weight per 100 parts by weight of the resin having a hydroxyl and/or carboxyl group for both cases where the polyolefin wax is solely of the high-melting type or a mixture of the high- and low-melting types. More than 20 parts by weight of the polyolefin wax forms a weak resin coating which is less lubricating. The proportion of the high- and low-melting types is such that the low-melting polyolefin wax is up to 70% by weight of the mixture. Since the frictional contact surface of the associated strip is at high temperatures during high-speed press forming as described above, a polyolefin wax mixture containing more than 70% of the low-melting type would become viscous and tacky at intermediate to final stages of the process, failing to provide adequate lubricity. In such a situation, the strip must be press formed at a speed of at most 50 mm/sec., which speed is too low for actual press operation.

The above-mentioned essential components are blended in the above-defined proportions so as to form a resin composition having a Tg of at least 70° C. while any other desired additives may also be blended.

Resin composition coatings having a Tg of lower than 70° C. tend to soften and separate from the underlying chromate coating when the worked surface of the associated strip becomes hot during high-speed press forming. Peeling of resin coatings causes resin fragments to deposit on the die and disturbs continuous press forming. The outside appearance of pressed articles is poor because of such powdering.

The lubricating resin coating on each surface of the strip has a weight of 0.3 to 3.0 grams per square meter ($gram/m^2$) on a dry basis. Resin coatings of less than 0.3 $gram/m^2$ are too thin to smooth out irregularities on the chromated steel strip or to provide corrosion resistance. Thicker coatings of more than 3.0 $gram/m^2$ show enhanced corrosion resistance, but detract from press formability, powdering resistance and economy.

Now one exemplary method for producing the lubricating resin coated steel strip according to the first embodiment of the present invention will be described.

The starting stock for the lubricating resin coated steel strip may be selected from steel strips having zinc, a zinc base alloy or an aluminum base alloy plated on both surfaces thereof, for example, zinc electroplated steel, zinc-nickel electroplated steel, zinc hot dipped steel, and 5% aluminum-zinc hot dipped steel.

Chromate coatings are then applied to both surfaces of the zinc plated steel substrate by any conventional well-known procedures. For example, dipping or electrolytic chromate treatment may be carried out on zinc plated steel in an aqueous solution containing chromic anhydride, a chromate salt, dichromic acid or the like as an active ingredient. Alternatively, coating chromate treatment may be carried out on zinc plated steel by applying a solution containing colloidal silica in the above-mentioned aqueous chromate solution to the strip steel. There results a chromate coating predominantly comprising hydrated chromium oxides. Usually, treatment of zinc plated steel with a chromate solution is followed by squeezing between flat rubber rolls or drying as by hot air blowing, thus forming chromate coatings on both surfaces of the steel strip.

Next, organic resin coatings are formed on both the chromate coatings from the above-mentioned resin composition.

The resin composition is prepared by providing necessary amounts of the essential components and optional additives and mixing them into a physically uniform dispersion. A silane coupling agent is preferably added to the dispersion, which is further milled into a physically uniform mixture or composite composition.

The resin composition is then applied to the chromated steel by any conventional well-known techniques such as roll coating, spraying, dipping, and brush coating to a predetermined thickness. The coatings are generally dried at a temperature of 80° to 180° C. for about 3 to about 90 seconds.

The lubricating resin coated steel strip having improved formability according to the first embodiment is produced in this way.

Second Embodiment

The lubricating resin coated steel strip having improved corrosion resistance according to the second embodiment of the present invention is described. The steel strip in the second form has an organic resin coating of the following composition and coating weight on each of the chromate coatings as described above. The organic resin coatings on opposite sides are generally the same.

The resin coatings are formed from a resin composition comprising (a) 100 parts by weight of a resin having a hydroxyl and/or carboxyl group, (b) 10 to 80 parts by weight of silica, and (c) 1.0 to 20 parts by weight of a solid lubricant in the form of a powder fluoro resin.

The resin composition has a glass transition temperature Tg of at least 70° C. Each of the resin coatings has a coating weight of 0.3 to 3.0 $gram/m^2$ on a dry basis.

Preferably, the resin coatings are formed from a resin composition comprising (a) 100 parts by weight of a resin having a hydroxyl and/or carboxyl group, (b) 10 to 80 parts by weight of silica, (c) 1.0 to 20 parts by weight of a solid lubricant in the form of a powder fluoro resin, and (d) a polyolefin wax having a melting point of at least 70° C., the weight ratio of the polyolefin wax to the fluoro resin being up to 1/1.

The resin composition has a glass transition temperature Tg of at least 70° C. Each of the resin coatings has a coating weight of 0.3 to 3.0 $gram/m^2$ on a dry basis.

The base resin used in the lubricating resin composition is a resin having a hydroxyl group or a carboxyl group or both hydroxyl and carboxyl groups. Examples of the base resin include epoxy resins, alkyd resins, acrylic resins, urethane resins, phenolic resins, melamine resins, and polyvinyl butyral resins.

The resins having a hydroxyl group and/or a carboxyl group are effective for the following reason. As described above, the lubricating resin coated steel strip in the second form is provided with an inorganic-organic composite coating of silica and resin for the purpose of improving corrosion resistance. Hydroxyl and carboxyl groups are desirable as the active group capable of reacting with hydroxyl groups on the silica surface to form a highly corrosion resistant film.

Silica is blended for the purpose of improving the corrosion resistance of the lubricating resin coated steel strip. A choice may be made of colloidal silicas such as Snowtex-O and Snowtex-N (both manufactured by Nissan Chemical K.K.), organosilica sols such as ethyl cellosolve silica sol available from Nissan Chemical K.K., silica powder such as gas phase silica powder available from Aerogel K.K., and organic silicates such as ethyl silicate. The powder silica preferably has a particle size of 5 to 70 nm for uniform dispersion.

A silane coupling agent may be included as a promoter for enhancing reaction between the base resin and silica. Examples of the silane coupling agent include $\gamma$-(2-aminoethyl)aminopropyltrimethoxysilane and $\gamma$-glycidoxypropyltrimethoxysilane.

Any commonly used additives including reaction promoters, stabilizers and dispersants may be blended with the base resin without detracting from the effectiveness of the present invention. Blending of such additives is often desirable.

The lubricity imparting agent is now described.

In general, various dry lubricants are known including wax, molybdenum disulfide, organic molybdenum compounds, graphite, carbon fluorides, metal soap, boron nitride and fluoro resins. These materials are used as lubricants for bearings or added to plastics, oil, grease or the like for improving lubricity. Using these dry lubricants, we attempted to produce resin coated steel strips having good lubricity.

As described above, high speed press working imposes to strip steel working conditions under which an amount of heat generates due to frictional slide motion. In order that resin coated steel strips have sufficient lubricity to allow for continuous press forming at high speeds without incurring coating separation under such severe press working conditions, a resin coating is necessary in which a lubricant having a low coefficient of friction and a high melting point is uniformly distributed on the surface. When steel strips are coated with such resin coatings, the lubricant uniformly distributed on the coating surface will reduce friction with the die or punch, thus preventing damage to the resin coating and improving continuous press formability.

We have found that organic lubricants having a relatively high melting point and a relatively low specific gravity can meet the above-mentioned requirements and inter alia, a powder fluoro resin is a useful lubricant and has an additional advantage of corrosion resistance improvement.

Non-limiting examples of the fluoro resin include a polytetrafluoroethylene resin, polyvinyl fluoride resin, polyvinylidene fluoride resin, polyfluoroethylene resin, and a mixture of two or more of them.

The powder fluoro resin may have a particle size of at least about 0.1 μm. It has been found that relatively large fluoro resin particles protruding beyond the resin coating are effective to accommodate friction and impact with the die or punch during press forming. Fluoro resins having a particle size of 1 to 7 μm are thus advantageous for resin coatings having a coating weight of 0.3 to 3 gram/m$^2$. Resin coatings containing fluoro resin with such a particle size can withstand severe working conditions as encountered when the blank holder pressure is increased above the ordinary level and the die or punch shoulder radius is reduced below the ordinary value.

Better lubricity is achieved when an additional lubricant, polyolefin wax having a melting point of at least 70° C. is combined with the fluoro resin. The polyolefin wax assists in dispersion of the fluoro resin in the base resin such that the fluoro resin may exert its lubricity to a greater extent.

The polyolefin wax may be selected from polymers of olefinic hydrocarbons, for example, polyethylene, polypropylene, and polybutene as long as they have a melting point of at least 70° C. A polyolefin wax having a melting point of lower than 70° C. is less effective for continuous high-speed press forming.

The numerical limits on the coating weight of the coatings and the proportion of components blended will be described.

In the second emoodiment, the chromate coating on each surface may have a coating weight of 10 to 200 mg/m$^2$ as Cr. Coating weights of less than 10 mg/m$^2$ are too thin to achieve corrosion resistance. Coating weights of more than 200 mg/m$^2$ are no longer advantageous for various reasons. Further improvement in corrosion resistance is less expectable for increments of coating weight. The chromate treating solution is drastically exhausted to render the surface appearance poor. In addition, thicker chromate coatings will adversely affect press formability.

The resin composition in the form of a resin mixture or resin composite contains specific proportions of the essential components, base resin, silica, and fluoro resin and optional components such as polyolefin wax.

The silica which is used for the purpose of improving corrosion resistance is added in an amount of 10 to 80 parts by weight per 100 parts by weight of the resin having a hydroxyl and/or carboxyl group. Less than 10 parts by weight of silica is less effective for corrosion resistance improvement. More than 80 parts by weight of silica forms a hard film which is prone to galling, lowering press formability.

The powder fluoro resin or lubricity imparting agent is added in an amount of 1.0 to 20 parts by weight per 100 parts by weight of the resin having a hydroxyl and/or carboxyl group. Less than 1.0 parts by weight of fluoro resin is too small to provide lubricity or press formability. More than 20 parts by weight of fluoro resin forms a weak resin coating which is readily damaged with a loss of corrosion resistance after working.

The polyolefin wax or secondary lubricity imparting agent is blended with the fluoro resin such that the weight ratio of polyolefin wax to fluoro resin is up to 1/1. With such weight ratios in excess of 1/1, there results a weak resin coating which cannot take full advantage of the lubricating nature of the fluoro resin.

The above-mentioned essential and optional components are blended in the above-defined proportions so as to form a resin composition having a Tg of at least 70° C. while any other desired additives may also be blended.

Resin composition coatings having a Tg of lower than 70° C. tend to soften and separate from the underlying chromate coating when the worked surface of the associated strip becomes hot during high-speed press forming. Peeling of resin coatings causes resin fragments to deposit on the die and disturbs continuous press forming. The outside appearance of pressed articles is poor because of such powdering.

The lubricating resin coating on each surface of the strip has a weight of 0.3 to 3.0 grams per square meter (gram/m$^2$) on a dry basis. Resin coatings of less than 0.3 gram/m$^2$ are too thin to smooth out irregularities on the chromated steel strip or to provide corrosion resistance. Thicker coatings of more than 3.0 gram/m$^2$ show enhanced corrosion resistance, but detract from press formability, powdering resistance and economy.

Now one exemplary method for producing the lubricating resin coated steel strip according to the second embodiment of the present invention will be described.

The starting stock for the lubricating resin coated steel strip may be selected from zinc plated steel strips, that is, steel strips having zinc, a zinc base alloy or an aluminum base alloy plated on both surfaces thereof, for example, zinc electroplated steel, zinc-nickel electroplated steel, zinc hot dipped steel, and 5% aluminum-zinc hot dipped steel.

Chromate coatings are then applied to both surfaces of the zinc plated steel substrate by any conventional well-known procedures. For example, dipping or electrolytic chromate treatment may be carried out on zinc plated steel in an aqueous solution containing chromic anhydride, a chromate salt, dichromic acid or the like as an active ingredient. Alternatively, coating chromate treatment may be carried out on zinc plated steel by applying a solution containing colloidal silica in the above-mentioned aqueous chromate solution to the strip steel. There results a chromate coating predominantly comprising hydrated chromium oxides. Usually, treatment of zinc plated steel with a chromate solution is followed by squeezing between flat rubber rolls or drying as by hot air blowing, thus forming chromate coatings on both surfaces of the steel strip.

Next, organic resin coatings are formed on both the chromate coatings as described above by applying the following composition to a coating weight of 0.3 to 3.0 gram/m$^2$ on a dry basis for each side.

The resin composition used herein contains (a) 100 parts by weight of a resin having a hydroxyl and/or carboxyl group, (b) 10 to 80 parts by weight of silica, and (c) 1.0 to 20 parts by weight of a solid lubricant in the form of a powder fluoro resin and has a glass transition temperature Tg of at least 70° C.

The other resin composition also used herein contains (a) 100 parts by weight of a resin having a hydroxyl and/or carboxyl group, (b) 10 to 80 parts by weight of silica, (c) 1.0 to 20 parts by weight of a solid lubricant in the form of a powder fluoro resin, and (d) a polyolefin wax having a melting point of at least 70° C., the weight ratio of the polyolefin wax to the fluoro resin being up to 1/1, and has a glass transition temperature Tg of at least 70° C. In both the compositions, it is rather preferred to blend therein any commonly used additives such as reaction promoters, stabilizers and dispersants.

Organic resin coatings may be formed on both the chromate coatings from the above-mentioned resin composition by the following procedure.

The resin composition is formulated by preparing necessary amounts of the essential components and optional additives and mixing them into a physically uniform dispersion. A silane coupling agent is preferably added to the dispersion, which is further milled into a physically uniform mixture or composite composition.

The resin composition is then applied to the chromated steel by any conventional well-known techniques such as roll coating, spraying, dipping, and brush coating to a predetermined thickness. The coatings are generally dried at a temperature of 80° to 180° C. for about 3 to about 90 seconds.

The lubricating resin coated steel strip having improved corrosion resistance according to the second embodiment is produced in this way.

Third Embodiment

The lubricating resin coated steel strip having improved formability and corrosion resistance according to the third embodiment of the present invention is described. The steel strip in the third form has different organic resin coatings on opposite sides. That is, an organic resin coating of the following composition and coating weight is on one of the chromate coatings as described above and another organic resin coating of the following composition and coating weight is on the other chromate coating.

The resin coating on one side is formed from a resin composition comprising (a) a resin having a hydroxyl and/or carboxyl group, (b) silica, and (c) a solid lubricant, and having a glass transition temperature Tg of at least 70° C. This resin coating has a coating weight of 0.3 to 3.0 gram/m$^2$ on a dry basis.

The other resin coating on the opposite side is formed from a solid lubricant-free resin composition comprising (a) a resin having a hydroxyl and/or carboxyl group and (b) silica.

This resin coating has a coating weight of 0.3 to 3.0 gram/m$^2$ on a dry basis.

The base resin used in the lubricating resin composition is a resin having a hydroxyl group or a carboxyl group or both hydroxyl and carboxyl groups. Examples of the base resin include epoxy resins, alkyd resins, acrylic resins, urethane resins, phenolic resins, melamine resins, and polyvinyl butyral resins.

The resins having a hydroxyl group and/or a carboxyl group are effective for the following reason. As described above, the lubricating resin coated steel strip in the second form is provided with an inorganic-organic composite coating of silica and resin for the purpose of improving corrosion resistance. Hydroxyl and carboxyl groups are desirable as the active group capable of reacting with hydroxyl groups on the silica surface to form a highly corrosion resistant film.

Silica is blended for the purpose of improving the corrosion resistance of the lubricating resin coated steel strip. A choice may be made of colloidal silicas such as Snowtex-O and Snowtex-N (both manufactured by Nissan Chemical K.K.), organosilica sols such as ethyl cellosolve silica sol available from Nissan Chemical K.K., silica powder such as gas phase silica powder available from Aerogel K.K., and organic silicates such as ethyl silicate. The powder silica preferably has a particle size of 5 to 70 nm for uniform dispersion.

A silane coupling agent may be included as a promoter for enhancing reaction between the base resin and silica. Examples of the silane coupling agent include γ-(2-aminoethyl)aminopropyltrimethoxysilane and γ-glycidoxypropyltrimethoxysilane.

Any commonly used additives including reaction promoters, stabilizers and dispersants may be blended with the base resin without detracting from the effectiveness of the present invention. Blending of such additives is often desirable.

The lubricity imparting agent is now described.

In general, various dry lubricants are known including wax, molybdenum disulfide, organic molybdenum compounds, graphite, carbon fluorides, metal soap, boron nitride and fluoro resins. These materials are used as lubricants for bearings or added to plastics, oil, grease or the like for improving lubricity. Using these dry lubricants, we attempted to produce resin coated steel strips having good lubricity.

As described above, high speed press working imposes to strip steel working conditions under which an amount of heat generates due to frictional slide motion. In order that resin coated steel strips have sufficient lubricity to allow for continuous deep drawing at high speeds without incurring coating separation under such severe press working conditions, a resin coating is necessary on one surface of the strip in which a lubricant having a low coefficient of friction and a high melting point is uniformly distributed on the surface. When a steel strip is coated with such a resin coating, the lubricant uniformly distributed on the coating surface will reduce friction with the die or punch, thus allowing smooth motion of the strip relative to the die or punch. A lubricant-free resin coating on the opposite surface of the strip provides frictional resistance to the punch or die, thus suppressing free motion of the strip relative to the punch or die. Differential motion on the opposite surfaces contributes to the deep drawability of the strip.

We have found that organic lubricants having a relatively high melting point and a relatively low specific gravity can meet the first-mentioned requirement and inter alia, powder fluoro resins and polyolefin compounds having a melting point of at least 70° C. are useful solid lubricants. The powder fluoro resins are particularly preferred since they have an additional advantage of corrosion resistance improvement. Better lubricity is achieved when a mixture of a fluoro resin and a polyolefin compound is used.

Non-limiting examples of the fluoro resin include a polytetrafluoroethylene resin, polyvinyl fluoride resin, polyvinylidene fluoride resin, polyfluoroethylene resin, and a mixture of two or more of them.

The powder fluoro resin may have a relatively small particle size, preferably up to about 10 μm. Resin compositions containing fluoro resin particles of a larger size are difficult to coat evenly. Fluoro resins having a particle size of 1 to 7 μm are advantageous for the same reason as previously described in the second embodiment.

The polyolefin compound may be selected from polymers of olefinic hydrocarbons, for example, polyethylene, polypropylene, and polybutene.

Where the polyolefin compound is a sole lubricant in the resin composition, it is preferred to use a polyolefin compound having a melting point of at least 70° C. (high-melting polyolefin).

During the high-speed press forming process, strips are heated to high temperatures on their surface in frictional contact with the die or punch. In this respect, use of the high-melting polyolefin which exerts good lubricity at such high temperatures is effective in improving lubricity.

If the lubricant consists solely of a polyolefin having a melting point of lower than 70° C. (low-melting polyolefin), it melts into liquid due to a temperature rise at the worked surface during high-speed press forming. The molten lubricant will flow away from the strip surface causing a local lack of lubricant, or adhere to the worked steel or die, adversely affecting continuous press forming and the outer appearance of the product.

However, a mixture of high- and low-melting polyolefins is effective. Lubricity is enhanced for the following reason.

Strips become hot on their surface in frictional contact with the die or punch during the high-speed press forming process as described above. The use of the high-melting polyolefin compound which exerts good lubricity at high temperatures is, of course, effective in improving lubricity. However, since the strip is at room temperature at the initial stage of press forming, the addition of low-melting polyolefin compound which is a good lubricant at room temperature assists in improving lubricity even at the initial. When a mixture of two types of polyolefin, that is, high- and low-melting polyolefin compounds is used, the low-melting polyolefin compound serves at the initial stage and the high-melting polyolefin compound serves at intermediate to final stages. Lubricity is thus improved throughout the press forming process.

The low-melting polyolefin is believed to improve the dispersion of the polyolefins in the base resin, thus providing a uniform frictional resistance between the coated steel strip and the die during press forming for further enhanced lubricity.

When the lubricant used is a mixture of a powder fluoro resin and a polyolefin compound, they can be selected from the above-mentioned fluoro resins and low- and high-melting polyolefin compounds. The use of a mixture of a powder fluoro resin and a polyolefin compound has the advantage that the polyolefin compound assists in dispersion of the powder fluoro resin in the base resin so that the fluoro resin may exert its lubricity to a greater extent.

As described above, the resin coating on one surface of the chromated steel strip is formed from a resin composition containing (a) a base resin, (b) silica, (c) a solid lubricant, and any other optional additive(s) in such proportions that the composition has a Tg of at least 70° C. whereas the other resin coating on the opposite surface of the chromated steel strip is formed from a resin composition containing (a) a base resin, (b) silica, and any other optional additive(s).

For the former resin coating on the one surface, the resin composition has a Tg of at least 70° C. Resin composition coatings having a Tg of lower than 70° C. tend to soften and separate from the underlying chromate coating when the worked surface of the associated strip becomes hot during high-speed press forming. Peeling of resin coatings causes resin fragments to deposit on the die and disturbs continuous press forming. The outside appearance of pressed articles is poor because of such powdering.

The lubricating resin coating on the one surface of the strip has a weight of 0.3 to 3.0 gram/m$^2$ on a dry basis. Resin coatings of less than 0.3 gram/m$^2$ are too thin to smooth out irregularities on the chromated steel strip or to provide corrosion resistance. Thicker coatings of more than 3.0 gram/m$^2$ show enhanced corrosion resistance, but detract from press formability, weldability, and economy.

The lubricant-free resin coating on the other surface of the strip has a weight of 0.3 to 3.0 gram/m$^2$ on a dry basis for similar reasons.

In practice, the resin coated steel strip of the third embodiment is preferably press formed at high speeds by placing it in a press such that the lubricating resin coating is on the side of the die and the lubricant-free resin coating is on the side of the punch. Deep drawability is expectable with this arrangement for the following reason. The coating on the die side has high lubricity and hence, low frictional resistance or drawing resistance whereas the coating on the punch side has low lubricity and hence, high frictional resistance or rupture resistance. This differential frictional resistance between the opposite coatings expedites deep drawing.

The numerical limits on the coating weight of the chromate coatings and the proportion of components blended in the resin compositions will be described.

In the third embodiment, the chromate coating on each surface is not particularly limited in coating weight in a broader sense, but may preferably have a coating weight of 10 to 200 mg/m$^2$ as Cr. Coating weights of less than 10 mg/m$^2$ are too thin to achieve corrosion resistance. Coating weights of more than 200 mg/m$^2$ are no longer advantageous for various reasons. Further improvement in corrosion resistance is less expectable for increments of coating weight. The chromate treating solution is drastically exhausted to render the surface appearance poor. In addition, thicker chromate coatings will adversely affect press formability.

The resin composition in the form of a resin mixture or resin composite preferably contains specific proportions of the essential components. The lubricant-free resin composition contains a base resin and silica whereas the lubricating resin composition contains a base resin, silica, and a solid lubricant (fluoro resin and/or polyolefin).

The silica which is used for the purpose of improving corrosion resistance is preferably added in an amount of 10 to 80 parts by weight per 100 parts by weight of the resin having a hydroxyl and/or carboxyl group. Less than 10 parts by weight of silica is less effective for corrosion resistance improvement. More than 80 parts by weight of silica forms a hard film which is prone to galling, lowering press formability.

The powder fluoro resin or lubricity imparting agent is preferably added in an amount of 1.0 to 20 parts by weight per 100 parts by weight of the resin having a hydroxyl and/or carboxyl group. Less than 1.0 parts by weight of fluoro resin is too small to provide lubricity or press formability. More than 20 parts by weight of fluoro resin forms a weak resin coating which is readily damaged with a loss of corrosion resistance after working.

The polyolefin compound, when it is used as a sole lubricity imparting agent, is preferably added in an amount of 1.0 to 20 parts by weight per 100 parts by weight of the resin having a hydroxyl and/or carboxyl group. When a mixture of high- and low-melting polyolefin compounds is used, their total amount is the same as above and the weight ratio of low/high-melting polyolefin is preferably up to 5/2. Less than 1.0 parts by weight of the polyolefin compound is too short for lubricity. More than 20 parts by weight of the polyolefin compound forms a weak resin coating which is readily damaged and fails to maintain post-working corrosion resistance. A weight ratio of low/high-melting polyolefin of more than 5/2 will render a resin coating susceptible to damages and finally lead to reduced post-working corrosion resistance and blocking properties of the associated steel strip.

Where the lubricity imparting agent is a mixture of a powder fluoro resin and a polyolefin compound, the powder fluoro resin is preferably added in an amount of 1.0 to 20 parts by weight per 100 parts by weight of the resin having a hydroxyl and/or carboxyl group. The polyolefin compound is blended with the fluoro resin such that the weight ratio of polyolefin to fluoro resin is up to 1/1. With such weight ratios in excess of 1/1, there results a weak resin coating which cannot take full advantage of the lubricating nature of the fluoro resin.

Now one exemplary method for producing the lubricating resin coated steel strip according to the third embodiment of the present invention will be described.

The starting stock for the lubricating resin coated steel strip may be selected from zinc plated steel strips, that is, steel strips having zinc, a zinc base alloy or an aluminum base alloy plated on both surfaces thereof, for example, zinc electroplated steel, zinc-nickel electroplated steel, zinc hot dipped steel, and 5% aluminum-zinc hot dipped steel.

Chromate coatings are then applied to both surfaces of the zinc plated steel substrate by any conventional well-known procedures. For example, dipping or electrolytic chromate treatment may be carried out on zinc plated steel in an aqueous solution containing chromic anhydride, a chromate salt, dichromic acid or the like as an active ingredient. Alternatively, coating chromate treatment may be carried out on zinc plated steel by applying a solution containing colloidal silica in the above-mentioned aqueous chromate solution to the strip steel. There results a chromate coating predominantly comprising hydrated chromium oxides. Usually, treatment of zinc plated steel with a chromate solution is followed by squeezing between flat rubber rolls or drying as by hot air blowing, thus forming chromate coatings on both surfaces of the steel strip.

Next, two different organic resin coatings are formed on the opposite chromate coatings as described above by applying the following compositions to a coating weight of 0.3 to 3.0 gram/m$^2$ on a dry basis for each side.

Organic resin coatings may be formed on the chromate coatings from the above-mentioned resin compositions by the following procedure.

The resin compositions are formulated by preparing necessary amounts of the essential components and optional additives and mixing them into physically uniform dispersions. A silane coupling agent is preferably added to the dispersions, which are further milled into physically uniform mixture or composite compositions.

Each of the resin compositions is then applied to the chromated steel by any conventional well-known techniques such as roll coating, spraying, dipping, and brush coating to a predetermined thickness. The coatings are generally dried at a temperature of 80° to 180° C. for about 3 to about 90 seconds.

The lubricating resin coated steel strip having improved formability and corrosion resistance according to the third embodiment is produced in this way.

In practice, the resin coated.steel strip of the third embodiment is preferably press formed at high speeds by placing it in a press such that the lubricating resin coating is on the die side and the lubricant-free resin coating is on the punch side.

EXAMPLE

Examples of the present invention are given below by way of illustration and not by way of limitation.

EXAMPLE 1

This is an example corresponding to the first embodiment of the invention.

Lubricating resin coated steel strips designated sample Nos. 101 to 117 were prepared under the following conditions.

1) Type of Plated Steel
   A. Zinc electroplated steel strip
      Steel thickness: 0.8 mm
      Zinc plating: 20 gram/m$^2$
   B. Zinc-nickel electroplated steel strip
      Steel thickness: 0.8 mm
      Zinc-nickel plating: 20 gram/m$^2$
      Nickel content: 12% by weight
   C. Zinc hot dipped steel strip
      Steel thickness: 0.8 mm
      Zinc plating: 60 gram/m$^2$
2) Chromate Treatment A chromate treating solution containing 20 gram/liter of $CrO_3$ and 4 gram/liter of $Na_3AlF_6$ was spray coated to both surfaces of each of the above-identified steel strips. The sprayed strips were passed between flat rubber rolls for squeezing and dried by blowing hot air. The amount of chromate coating deposited was controlled to the values reported in Table 1 (up to 200 mg/m$^2$ as Cr on each side) by adjusting the spraying time.

3) Resin Coating

Coating dispersions having the composition reported in Table 1 were applied to both the surfaces of the chromated strips by roll coating, and dried at 150° C. for 40 seconds, forming resin coatings each having a coating weight of 0.3 to 3.0 gram/m$^2$.

For comparison purposes, sample Nos. 118 to 129 were prepared by the same procedures as above except that some parameters were outside the scope of the present invention. Plated steel strips were subjected to chromate treatment and coating dispersions having the composition reported in Table 1 were then applied to both the surfaces of the chromated strips to form resin coatings in the coating weights reported in Table 1.

All the samples, Nos. 101 through 129 were examined for lubricity, flat plate corrosion resistance, and post-working corrosion resistance by the following tests.

Lubricity Test .

The Erichsen deep drawing cup test was carried out. Specimens of the same lot were deep drawn without lubricant oil by an Erichsen deep drawing machine while varying the drawing ratio, determining the limiting drawing ratio. At the same time, the powdering resistance was evaluated by collecting powdery deposits on the die (resulting from peeling of the resin coating) using adhesive tape.

Drawing conditions:
- Blank holder pressure: 1 ton
- Punch diameter: 33 mm
- Blank diameter: 59–79 mm
- Drawing speed: 5 mm/sec. and 500 mm/sec.

Evaluation criterion:
- ◎: no deposit on the die
- O : less deposits on the die
- Δ: deposits on the die
- X : much deposits on the die

Flat Plate Corrosion Test

A salt spray test was carried out according to JIS Z-2371 to measure the testing time until white rust occurred.

Post-Working Corrosion Test

Specimens were deep drawn without lubricant oil by an Erichsen cup drawing machine under the following conditions. A salt spray test was carried out on the drawn surface of the cups according to JIS Z-2371. The testing time taken until white rust occurred was measured.

Drawing conditions:
- Blank holder pressure: 1 ton
- Punch diameter: 33 mm
- Blank diameter: 59 mm
- Drawing ratio: 1.78
- Drawing speed: 500 mm/sec.

The results are shown in Table 2.

As is evident from Table 2, the lubricating resin coated steel strips falling within the scope of the present invention show excellent continuous formability and lubricity during high-speed press forming, leaving little or no powder after working. They also show good post-working corrosion resistance.

TABLE 1-1

| Sample No. | Type of plated steel | Chromate coating: Coating weight ($mg/m^2$) | Resin composition: Base resin Type[1)] | Base resin Amount (pbw) | Silica[2)] Amount (pbw) | Polyethylene wax Low-melting type m.p. (°C.) | Low-melting type Amount (pbw) | High-melting type m.p. (°C.) | High-melting type Amount (pbw) | Tg (°C.) | Coating weight ($g/m^2$) |
|---|---|---|---|---|---|---|---|---|---|---|---|
| 101 | A | 0 | a | 100 | 40 | — | — | 85 | 15 | 95 | 2.5 |
| 102 | A | 30 | a | 100 | 30 | — | — | 80 | 20 | 85 | 0.8 |
| 103 | A | 50 | a | 100 | 30 | — | — | 90 | 10 | 80 | 1.2 |
| 104 | B | 100 | a | 100 | 30 | — | — | 70 | 5 | 75 | 1.5 |
| 105 | C | 50 | a | 100 | 10 | — | — | 70 | 2 | 70 | 2.5 |
| 106 | A | 50 | b | 100 | 30 | — | — | 75 | 1 | 70 | 2.5 |
| 107 | A | 50 | b | 100 | 30 | — | — | 80 | 2 | 80 | 2.5 |
| 108 | B | 50 | c | 100 | 80 | — | — | 80 | 5 | 80 | 1.0 |
| 109 | A | 0 | a | 100 | 30 | 40 | 7 | 80 | 3 | 70 | 2.5 |
| 110 | A | 30 | a | 100 | 40 | 40 | 6 | 75 | 4 | 80 | 1.2 |
| 111 | A | 50 | a | 100 | 40 | 50 | 4 | 80 | 6 | 70 | 1.2 |
| 112 | B | 40 | a | 100 | 40 | 30 | 3 | 75 | 10 | 70 | 1.0 |
| 113 | C | 100 | b | 100 | 40 | 35 | 2 | 90 | 18 | 85 | 0.8 |
| 114 | C | 50 | b | 100 | 80 | 50 | 10 | 85 | 10 | 80 | 0.8 |
| 115 | A | 50 | c | 100 | 40 | 40 | 0.5 | 70 | 2 | 70 | 2.5 |
| 116 | A | 50 | c | 100 | 30 | 30 | 1 | 80 | 0.5 | 80 | 2.5 |
| 117 | A | 50 | c | 100 | 30 | 30 | 0.5 | 90 | 1 | 85 | 2.5 |

1)a: Carboxyl-modified epoxy resin (10 mol % carboxyl group, Mn = 10,000)
b: Polyvinyl butyral resin
c: Polyvinyl formal resin
2)Silica powder by Aerogel K.K. (average particle size: 20 nm)

TABLE 1-2

| Sample No. | Type of plated steel | Chromate coating: Coating weight ($mg/m^2$) | Resin composition: Base resin Type[1)] | Base resin Amount (pbw) | Silica[2)] Amount (pbw) | Polyethylene wax Low-melting type m.p. (°C.) | Low-melting type Amount (pbw) | High-melting type m.p. (°C.) | High-melting type Amount (pbw) | Tg (°C.) | Coating weight ($g/m^2$) |
|---|---|---|---|---|---|---|---|---|---|---|---|
| 118* | A | 250 | a | 100 | 30 | — | — | 85 | 20 | 95 | 2.5 |
| 119* | A | 50 | c | 100 | 30 | — | — | 80 | 20 | 65 | 1.5 |
| 120* | A | 50 | c | 100 | 100 | — | — | 75 | 10 | 100 | 1.5 |
| 121* | A | 50 | c | 100 | 30 | — | — | 75 | 25 | 100 | 1.2 |
| 122* | B | 50 | b | 100 | 40 | 45 | 5 | — | — | 100 | 1.4 |
| 123* | C | 0 | d | 100 | 30 | 40 | 8 | 90 | 2 | 85 | 1.4 |
| 124* | A | 30 | e | 100 | 40 | 35 | 10 | 80 | 10 | 80 | 1.4 |
| 125* | A | 50 | a | 100 | 0 | 38 | 6 | 75 | 4 | 50 | 1.8 |
| 126* | A | 50 | b | 100 | 0 | — | — | 90 | 2 | 60 | 1.2 |
| 127* | B | 50 | c | 100 | 30 | — | — | — | — | 85 | 0.8 |
| 128* | B | 50 | b | 100 | 30 | 40 | 7 | 80 | 3 | 75 | 0.2 |

TABLE 1-2-continued

| | | Chromate coating | Resin composition | | | | | | | | | |
|---|---|---|---|---|---|---|---|---|---|---|---|---|
| | | | | | | Polyethylene wax | | | | | | |
| | Type of | Coating | Base resin | | Silica[2)] | Low-melting type | | High-melting type | | | | Coating |
| Sample No. | plated steel | weight (mg/m$^2$) | Type[1)] | Amount (pbw) | Amount (pbw) | m.p. (°C.) | Amount (pbw) | m.p. (°C.) | Amount (pbw) | Tg (°C.) | | weight (g/m$^2$) |
| 129* | A | 50 | a | 100 | 40 | 50 | 4 | 85 | 6 | 72 | | 3.5 |

[1)]a: Carboxyl-modified epoxy resin (10 mol % carboxyl group, Mn = 10,000)
b: Polyvinyl butyral resin
c: Polyvinyl formal resin
[2)]Silica powder by Aerogel K.K. (average particle size: 20 nm)

TABLE 2-1

| | Lubricity | | | | Plate | Post-working |
|---|---|---|---|---|---|---|
| | Low speed (5 mm/sec.) | | High speed (500 mm/sec.) | | corrosion | corrosion |
| Sample No. | Limiting drawing ratio | Powdering resistance | Limiting drawing ratio | Powdering resistance | resistance (hour) | resistance (hour) |
| 101 | 2.20 | ◎ | 2.38 | ◎ | ≧500 | 140 |
| 102 | 2.20 | ◎ | 2.38 | ◎ | ≧500 | 140 |
| 103 | 2.20 | ◎ | 2.38 | ◎ | ≧500 | 200 |
| 104 | 2.20 | ◎ | 2.38 | ◎ | ≧500 | 200 |
| 105 | 2.20 | ◎ | 2.38 | ◎ | ≧500 | 140 |
| 106 | 2.20 | ◎ | 2.38 | ◎ | ≧500 | 200 |
| 107 | 2.20 | ◎ | 2.38 | ◎ | ≧500 | 200 |
| 108 | 2.20 | ◎ | 2.38 | ◎ | ≧500 | 200 |
| 109 | 2.40 | ◎ | 2.42 | ◎ | ≧500 | 140 |
| 110 | 2.40 | ◎ | 2.42 | ◎ | ≧500 | 200 |
| 111 | 2.38 | ◎ | 2.42 | ◎ | ≧500 | 200 |
| 112 | 2.38 | ◎ | 2.42 | ◎ | ≧500 | 200 |
| 113 | 2.38 | ◎ | 2.42 | ◎ | ≧500 | 140 |
| 114 | 2.40 | ◎ | 2.45 | ◎ | ≧500 | 140 |
| 115 | 2.30 | ◎ | 2.42 | ◎ | ≧500 | 200 |
| 116 | 2.30 | ◎ | 2.42 | ◎ | ≧500 | 200 |
| 117 | 2.30 | ◎ | 2.42 | ◎ | ≧500 | 200 |

TABLE 2-2

| | Lubricity | | | | Plate | Post-working |
|---|---|---|---|---|---|---|
| | Low speed (5 mm/sec.) | | High speed (500 mm/sec.) | | corrosion | corrosion |
| Sample No. | Limiting drawing ratio | Powdering resistance | Limiting drawing ratio | Powdering resistance | resistance (hour) | resistance (hour) |
| 118* | 2.20 | ◎ | 2.38 | X | ≧500 | 100 |
| 119* | 2.20 | ◎ | 2.26 | Δ | ≧500 | 100 |
| 120* | 2.20 | ◎ | 2.20 | Δ | ≧500 | 70 |
| 121* | 2.22 | Δ | 2.42 | X | ≧500 | 100 |
| 122* | 2.38 | ◎ | 2.20 | X | ≧500 | 70 |
| 123* | 2.38 | ◎ | 2.10 | X | ≧500 | 48 |
| 124* | 2.40 | ◎ | 2.40 | Δ | ≧500 | 100 |
| 125* | 2.40 | ◎ | 2.20 | Δ | 200 | 24 |
| 126* | 2.20 | ○ | 2.40 | Δ | 200 | 24 |
| 127* | 2.20 | X | 2.10 | X | ≧500 | 180 |
| 128* | 2.25 | ◎ | 2.32 | ◎ | 250 | 24 |
| 129* | 2.40 | ○ | 2.40 | X | ≧500 | 70 |

EXAMPLE 2

This is an example corresponding to the second embodiment of the invention. .

Lubricating resin coated steel strips designated sample Nos. 201 to 220 were prepared under the following conditions.

1) Type of Plated Steel

Same as in Example 1.

2) Chromate Treatment

Same as in Example 1.

3) Resin Coating

Resin coatings were formed by substantially the same procedure as in Example 1 except that the compositions reported in Table 3 were applied.

For comparison purposes, sample Nos. 221 to 234 were prepared by the same procedures as above except that some parameters were outside the scope of the present invention. Plated steel strips were subjected to chromate treatment and coating dispersions having the composition reported in Table 3 were then applied to both the surfaces of the chromated strips to form resin coatings in the coating weights reported in Table 3.

All the samples, Nos. 201 through 234 were examined for lubricity, flat plate corrosion resistance, and post-working corrosion resistance by the same lubricity test, flat plate corrosion test, and post-working corrosion test as in Example 1.

The results are shown in Table 4.

As is evident from Table 4, the lubricating resin coated steel strips falling within the scope of the present invention show excellent lubricity during high-speed press forming. They are fully resistant to corrosion both as formed and as worked.

TABLE 3-1

| | | Chromate coating | Resin composition | | | | | | | | |
|---|---|---|---|---|---|---|---|---|---|---|---|
| | Type of | Coating | Base resin | | Silica[2)] | Fluoro resin | | Polyethylene wax | | | Coating |
| Sample No. | plated steel | weight (mg/m²) | Type[1)] | Amount (pbw) | Amount (pbw) | type[3)] | Amount (pbw) | m.p. (°C.) | Amount (pbw) | Tg (°C.) | weight (g/m²) |
| 201 | A | 10 | a | 100 | 30 | F1 | 2.0 | — | — | 95 | 1.0 |
| 202 | A | 50 | a | 100 | 30 | F1 | 2.0 | — | — | 95 | 1.0 |
| 203 | A | 100 | a | 100 | 30 | F1 | 2.0 | — | — | 95 | 0.5 |
| 204 | A | 200 | a | 100 | 30 | F1 | 2.0 | — | — | 95 | 2.5 |
| 205 | A | 50 | a | 100 | 10 | F1 | 2.0 | — | — | 85 | 1.0 |
| 206 | A | 50 | a | 100 | 80 | F1 | 2.0 | — | — | 110 | 1.0 |
| 207 | A | 50 | a | 100 | 30 | F1 | 1.0 | — | — | 95 | 1.0 |
| 208 | A | 50 | a | 100 | 30 | F1 | 20.0 | — | — | 95 | 1.0 |
| 209 | A | 50 | b | 100 | 30 | F1 | 2.0 | — | — | 90 | 1.0 |
| 210 | A | 50 | a | 100 | 30 | F1 | 2.0 | 100 | 0.5 | 95 | 1.0 |
| 211 | A | 50 | a | 100 | 30 | F1 | 2.0 | 100 | 1.0 | 95 | 1.0 |
| 212 | A | 50 | a | 100 | 30 | F1 | 2.0 | 85 | 0.5 | 93 | 1.0 |
| 213 | B | 50 | a | 100 | 30 | F1 | 2.0 | — | — | 95 | 1.0 |
| 214 | C | 50 | a | 100 | 30 | F1 | 2.0 | — | — | 95 | 1.0 |
| 215 | B | 30 | b | 100 | 40 | F2 | 2.0 | 90 | 1.0 | 90 | 0.8 |
| 216 | A | 40 | a | 100 | 30 | F3 | 2.0 | 100 | 0.8 | 95 | 1.0 |
| 217 | A | 50 | a | 100 | 50 | F4 | 2.0 | — | — | 85 | 1.0 |
| 218 | B | 50 | b | 100 | 30 | F1 | 2.0 | 90 | 0.5 | 93 | 1.2 |
| 219 | C | 50 | b | 100 | 30 | F1 | 2.0 | — | — | 95 | 1.0 |
| 220 | A | 50 | a | 100 | 30 | F2 | 2.0 | — | — | 100 | 1.0 |

1)a: Carboxyl-modified epoxy resin (10 mol % carboxyl group, Mn = 10,000)
b: Polyvinyl butyral resin
2)Silica powder by Aerogel K.K. (average particle size: 20 nm)
3)F1: Polytetrafluoroethylene dispersion (Particle size 0.1-0.5 μm)
F2: Polyvinyl fluoride resin (average particle size 6 μm)
F3: Polyvinylidene fluoride resin (average particle size 1 μm)
F4: Polytetra fluoroethylene resin (average particle size 5 μm)

TABLE 3-2

| | | Chromate coating | Resin composition | | | | | | | | |
|---|---|---|---|---|---|---|---|---|---|---|---|
| | Type of | Coating | Base resin | | Silica[2)] | Fluoro resin | | Polyethylene wax | | | Coating |
| Sample No. | plated steel | weight (mg/m²) | Type[1)] | Amount (pbw) | Amount (pbw) | type[3)] | Amount (pbw) | m.p. (°C.) | Amount (pbw) | Tg (°C.) | weight (g/m²) |
| 221 | A | 5 | a | 100 | 30 | F1 | 2.0 | — | — | 95 | 1.0 |
| 222 | A | 250 | a | 100 | 30 | F1 | 2.0 | — | — | 95 | 1.0 |
| 223 | A | 50 | c | 100 | 30 | F1 | 2.0 | — | — | 65 | 1.0 |
| 224 | A | 50 | a | 100 | 120 | F1 | 2.0 | — | — | 115 | 1.0 |
| 225 | A | 50 | a | 100 | 5 | F1 | 2.0 | — | — | 70 | 1.0 |
| 226 | A | 50 | a | 100 | 30 | — | — | — | — | 95 | 1.0 |
| 227 | A | 50 | a | 100 | 30 | F1 | 0.6 | — | — | 95 | 1.0 |
| 228 | A | 50 | a | 100 | 30 | F1 | 2.0 | 100 | 3.0 | 95 | 1.0 |
| 229 | A | 50 | a | 100 | 30 | F1 | 2.0 | 65 | 0.5 | 76 | 1.0 |
| 230 | A | 50 | a | 100 | — | — | — | 100 | 2.0 | 63 | 1.0 |
| 231 | A | 50 | a | 100 | — | — | — | — | — | 62 | 1.0 |
| 232 | A | 50 | d | 100 | 30 | F1 | 2.0 | — | — | 60 | 1.0 |
| 233 | A | 50 | a | 100 | 30 | F1 | 2.0 | — | — | 95 | 0.2 |
| 234 | A | 50 | a | 100 | 30 | F1 | 2.0 | — | — | 95 | 3.5 |

1)a: Carboxyl-modified epoxy resin (10 mol % carboxyl group, Mn = 10,000)
b: Polyvinyl butyral resin
2)Silica powder by Aerogel K.K. (average particle size: 20 nm)
3)F1: Polytetrafluoroethylene dispersion (Particle size 0.1-0.5 μm)
F2: Polyvinyl fluoride resin (average particle size 6 μm)

TABLE 4-1

| | Lubricity | | | | Plate | Post-working |
|---|---|---|---|---|---|---|
| | Low speed (5 mm/sec.) | | High speed (500 mm/sec.) | | corrosion | corrosion |
| Sample No. | Limiting drawing ratio | Powdering resistance | Limiting drawing ratio | Powdering resistance | resistance (hour) | resistance (hour) |
| 201 | 2.40 | ◎ | 2.38 | ○ | ≧500 | 140 |
| 202 | 2.40 | ◎ | 2.38 | ○ | ≧500 | 160 |
| 203 | 2.40 | ◎ | 2.38 | ○ | ≧500 | 140 |
| 204 | 2.40 | ◎ | 2.38 | ○ | ≧500 | 160 |
| 205 | 2.40 | ◎ | 2.38 | ○ | ≧500 | 160 |
| 206 | 2.40 | ◎ | 2.38 | ○ | ≧500 | 140 |
| 207 | 2.40 | ◎ | 2.38 | ○ | ≧500 | 160 |
| 208 | 2.40 | ◎ | 2.38 | ○ | ≧500 | 160 |
| 209 | 2.40 | ◎ | 2.38 | ○ | ≧500 | 160 |
| 210 | 2.40 | ◎ | 2.40 | ◎ | ≧500 | 160 |
| 211 | 2.40 | ◎ | 2.40 | ◎ | ≧500 | 160 |
| 212 | 2.40 | ◎ | 2.40 | ◎ | ≧500 | 160 |
| 213 | 2.40 | ◎ | 2.38 | ○ | ≧500 | 200 |
| 214 | 2.40 | ◎ | 2.38 | ○ | ≧500 | 160 |
| 215 | 2.40 | ◎ | 2.38 | ◎ | ≧500 | 160 |

TABLE 4-1-continued

| | Lubricity | | | | Plate | Post-working |
|---|---|---|---|---|---|---|
| | Low speed (5 mm/sec.) | | High speed (500 mm/sec.) | | corrosion | corrosion |
| Sample No. | Limiting drawing ratio | Powdering resistance | Limiting drawing ratio | Powdering resistance | resistance (hour) | resistance (hour) |
| 216 | 2.40 | ◎ | 2.38 | ◎ | ≧500 | 160 |
| 217 | 2.40 | ◎ | 2.38 | ◎ | ≧500 | 160 |
| 218 | 2.40 | ◎ | 2.38 | ○ | ≧500 | 140 |
| 219 | 2.40 | ◎ | 2.38 | ○ | ≧500 | 140 |
| 220 | 2.40 | ◎ | 2.38 | ◎ | ≧500 | 160 |

Note: Blank holder pressure
1 ton for sample Nos. 201-214
2 ton for sample Nos. 215-220

TABLE 4-2

| | Lubricity | | | | Plate | Post-working |
|---|---|---|---|---|---|---|
| | Low speed (5 mm/sec.) | | High speed (500 mm/sec.) | | corrosion | corrosion |
| Sample No. | Limiting drawing ratio | Powdering resistance | Limiting drawing ratio | Powdering resistance | resistance (hour) | resistance (hour) |
| 221 | 2.38 | ◎ | 2.22 | Δ | 300 | 48 |
| 222 | 2.38 | ◎ | 2.22 | Δ | ≧500 | 96 |
| 223 | 2.38 | ◎ | 2.00 | Δ | ≧500 | 48 |
| 224 | 2.38 | ◎ | 2.00 | Δ | ≧500 | 48 |
| 225 | 2.38 | ◎ | 2.00 | Δ | 300 | 24 |
| 226 | 2.00 | X | 1.80 | X | ≧500 | ≦24 |
| 227 | 2.38 | ◎ | 2.00 | Δ | ≧500 | 48 |
| 228 | 2.38 | ◎ | 2.00 | Δ | ≧500 | 72 |
| 229 | 2.38 | ◎ | 2.00 | Δ | ≧500 | 72 |
| 230 | 2.38 | ◎ | 1.96 | X | 250 | ≦24 |
| 231 | 2.00 | X | 1.80 | X | 250 | ≦24 |
| 232 | 2.38 | ◎ | 2.00 | Δ | ≧500 | 48 |
| 233 | 2.22 | ◎ | 2.00 | Δ | 300 | 24 |
| 234 | 2.38 | ○ | 2.00 | X | ≧500 | 48 |

EXAMPLE 3

This is an example corresponding to the third embodiment of the invention.

Lubricating resin coated steel strips designated sample Nos. 301 to 309 were prepared under the following conditions.

1) Type of Plated Steel

Same as in Example 1.

2) Chromate Treatment

Substantially the same as in Example 1. The amount of chromate coating deposited was controlled to 50 $mg/m^2$ as Cr on each side by adjusting the spraying time.

3) Resin Coating

Two different coating compositions were prepared as reported in Table 5. One composition was applied to one surface of the chromated strips and the other composition was then applied to the opposite surface, both by roll coating. The coatings were dried at 150° C. for 40 seconds. A lubricant-containing resin coating was formed on the one surface and a lubricant-free resin coating was formed on the opposite surface. The amount of each coating applied was reported in Table 5 on a dry basis.

For comparison purposes, sample Nos. 310 to 314 were prepared by the same procedures as above except that some parameters were outside the scope of the present invention. Plated steel strips were subjected to chromate treatment and coating dispersions having the composition reported in Table 5 were then applied to the opposite surfaces of the chromated strips to the coating weights reported in Table 5. Some samples had lubricant-containing resin coatings on both the surfaces and the remaining samples had lubricant-free resin coatings on both the surfaces.

All the samples, Nos. 301 through 314 were examined for lubricity, flat plate corrosion resistance, and post-working corrosion resistance by substantially the same tests as in Example 1.

Lubricity Test

Substantially the same as in Example 1. During drawing, the coated strip was placed on the die such that the lubricant-containing resin coating was on the die side. The blank holder pressure was increased to 3 ton.

Flat Plate Corrosion Test

Same as in Example 1.

Post-Working Corrosion Test

The test was substantially the same as in Example 1 except that the blank holder pressure was increased to 3 ton.

The results are shown in Table 6.

As is evident from Table 6, the lubricating resin coated steel strips falling within the scope of the present invention show excellent lubricity during high-speed press forming. Deep drawability is satisfactory. They are fully resistant to corrosion both as formed and as worked.

TABLE 5

| | | Resin composition* | | | | | | | | |
|---|---|---|---|---|---|---|---|---|---|---|
| | | | | | Solid lubricant | | | | | |
| | Type of | Base resin | | Silica[2)] | Fluoro resin | | Polyethylene wax | | | Coating |
| Sample No. | plated steel | Type[1)] | Amount (pbw) | Amount (pbw) | type[3)] | Amount (pbw) | m.p. (°C.) | Amount (pbw) | Tg** (°C.) | weight ($g/m^2$) |
| 301 | A | a | 100 | 30 | F1 | 2.0 | — | — | 95 | 1.0 |
| 302 | A | a | 100 | 30 | F1 | 2.0 | — | — | 95 | 0.5 |
| 303 | A | a | 100 | 30 | F1 | 2.0 | — | — | 95 | 2.5 |
| 304 | A | a | 100 | 30 | F1 | 20.0 | 40 | 0.5 | 95 | 1.0 |
| 305 | A | a | 100 | 30 | — | — | 85 | 2.0 | 95 | 1.0 |
| 306 | A | b | 100 | 30 | F2 | 1.5 | — | — | 90 | 1.0 |
| 307 | A | b | 100 | 40 | F2 | 2.0 | — | — | 90 | 1.0 |
| 308 | B | b | 100 | 40 | F2 | 2.0 | — | — | 90 | 1.0 |
| 309 | C | b | 100 | 40 | F2 | 2.0 | — | — | 90 | 1.0 |
| 310 | A | a | 100 | 30 | — | — | — | — | 95 | 1.0 |
| 311 | A | a | 100 | 30 | F1 | 2.0 | — | — | 95 | 1.0 |
| 312 | A | a | 100 | 30 | F1 | 2.0 | — | — | 95 | 0.3 |
| 313 | A | a | 100 | 30 | — | — | 85 | 2.0 | 95 | 1.0 |
| 314 | A | c | 100 | 30 | F1 | 2.0 | — | — | 60 | 1.0 |

1)a: Carboxyl-modified epoxy resin (10 mol % carboxyl group, Mn = 10,000)
b: Polyvinyl butyral resin
c: Oil-modified epoxy ester resin
2)Silica powder by Aerogel K.K. (average particle size: 20 nm)
3)F1: Polytetrafluoroethylene dispersion (Particle size 0.1–0.5 μm)
F2: Polyvinyl fluoride resin (average particle size 1 μm)
Note:
*Two different resin compositions were applied to opposite surfaces. One resin composition contained the four components: base resin, silica, fluoro resin, and polyethylene wax. The other resin composition contained only the base resin and silica.
**Tg is the glass transition temperature of the solid lubricant-containing resin compositions.

TABLE 6

| | Lubricity | | Plate corrosion | Post-working corrosion |
|---|---|---|---|---|
| Sample No. | Limiting drawing ratio | Powdering resistance | resistance (hour) | resistance (hour) |
| 301 | 2.40 | ⊚ | ≧500 | 160 |
| 302 | 2.38 | ⊚ | ≧500 | 140 |
| 303 | 2.40 | ⊚ | ≧500 | 160 |
| 304 | 2.42 | ⊚ | ≧500 | 160 |
| 305 | 2.30 | ⊚ | ≧500 | 100 |
| 306 | 2.38 | ⊚ | ≧500 | 160 |
| 307 | 2.38 | ⊚ | ≧500 | 160 |
| 308 | 2.38 | ⊚ | ≧500 | 160 |
| 309 | 2.38 | ⊚ | ≧500 | 160 |
| 310* | 1.80 | X | ≧500 | ≦24 |
| 311 | 2.00 | ○ | ≧500 | 72 |
| 312 | 2.00 | ○ | 300 | ≦24 |
| 313 | 2.00 | ○ | ≧500 | 72 |
| 314 | 1.96 | X | ≧500 | 48 |

As described above, the present invention in the first form provides surface-treated steel strips having high lubricity during high-speed press forming and thus featuring continuous press forming. They can be readily press formed without the need for lubricant like press oil. They are also resistant to stains as by finger prints during handling.

The present invention in the second form provides surface-treated steel strips having improved corrosion resistance and exhibiting high lubricity during high-speed press forming. They can be readily press formed without the need for lubricant like press oil. They are also resistant to stains as by finger prints during handling.

The present invention in the second and third forms provides surface-treated steel strips which develop little rust during the period between their manufacture and actual working by the user.

In all the first to third forms, the lubricating resin coated steel strips of the invehtion allow the user to omit the lubricant oil applying step which is necessary for facilitating smooth press forming and must be followed by degreasing in the prior art, contributing to a cost reduction.

Obviously many modifications and variations of the present invention are possible in the light of the above teachings. It is therefore to be understood that within the scope of the appended claims, the invention may be practiced otherwise than as specifically described.

We claim:

1. A lubricating resin coated steel strip having improved formability, comprising a steel substrate having zinc, a zinc base alloy or an aluminum base alloy plated on each surface thereof, a chromate coating on each surface of said substrate, each said chromate coating having a coating weight of up to 200 $mg/m^2$ as Cr, and a resin coating on each of the chromate coatings, said resin coatings being formed from a resin composition comprising (a) 100 parts by weight of a resin having at least one member of the group consisting of a hydroxyl and carboxyl group, (b) 10 to 80 parts by weight of silica, and (c) up to 20 parts by weight of a solid lubricant, said resin composition having a glass transition temperature Tg of at least 70° C., each said resin coatings having a dry coating weight of 0.3 to 3 $gram/m^2$.

2. A lubricating resin coated steel strip of claim 1 wherein said solid lubricant is a polyolefin wax having a melting point of at least 70° C.

3. A lubricating resin coated steel strip of claim 1 wherein said solid lubricant is a mixture of a polyolefin wax having a melting point of at least 70° C., the former wax being up to 70% by weight of the mixture.

4. A lubricating resin coated steel strip of claim 1 wherein said solid lubricant is 1.0 to 20 parts by weight of a powder fluoro resin.

5. A lubricating resin coated steep strip of claim 4 wherein said resin composition further comprises (d) a polyolefin wax having a melting point of at least 70° C., the weight ratio of said polyolefin wax to said fluoro resin being up to 1.0.

6. A lubricating resin coated steel strip of claim 4 wherein said powder fluoro resin has a particle size of 1 to 7 μm.

7. A lubricating resin coated steel strip of claim 4 wherein said resin composition further comprises (e) a silane coupling agent.

8. A lubricating resin coated steel strip having improved formability and corrosion resistance, comprising a steel substrate having zinc, a zinc base alloy or an aluminum base alloy plated on each surface thereof, chromate coatings on both plated surfaces of said substrate, a resin coating on one of the chromate coatings formed from a resin composition comprising (a) a resin having at least one member of the group consisting of hydroxyl and carboxyl groups, (b) silica, and (c) a solid lubricant and having a glass transition temperature Tg of at least 70° C., and another resin coating on the other chromate coating formed from a resin composition comprising (a) a resin having at least one member selected from the group consisting of hydroxyl and carboxyl groups and (b) silica, each of said resin coatings having a dry coating weight of 0.3 to 3 gram/m$^2$.

9. A lubricating resin coated steel strip of claim 8 wherein said solid lubricant comprises a fluoro resin or a polyolefin compound having a melting point of at least 70° C.

10. A lubricating resin coated steel strip of claim 8 wherein said solid lubricant comprises a mixture of a fluoro resin and a polyolefin compound.

* * * * *

UNITED STATES PATENT AND TRADEMARK OFFICE

CERTIFICATE OF CORRECTION

PATENT NO. : 5,061,575

DATED : October 29, 1991

INVENTOR(S) : TAIZO MOHRI et al

It is certified that error appears in the above-identified patent and that said Letters Patent is hereby corrected as shown below:

Column 26, line 62, after "melting point of" please insert --lower than 70°C and a polyolefin wax having a melting point of--

Signed and Sealed this

Twenty-ninth Day of March, 1994

Attest:

BRUCE LEHMAN

*Attesting Officer* — *Commissioner of Patents and Trademarks*